US 6,709,135 B2

(12) United States Patent
Couillaud et al.

(10) Patent No.: US 6,709,135 B2
(45) Date of Patent: Mar. 23, 2004

(54) DEVICE FOR AUTOMATIC CORRECTION OF THE ORIENTATION OF A MOTOR-VEHICLE HEADLAMP IN ELEVATION

(75) Inventors: Philippe Couillaud, Bobigny Cedex (FR); Joël Leleve, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 12 days.

(21) Appl. No.: 09/966,950

(22) Filed: Sep. 28, 2001

(65) Prior Publication Data

US 2002/0075691 A1 Jun. 20, 2002

(30) Foreign Application Priority Data

Oct. 27, 2000 (FR) .............................. 00 13890

(51) Int. Cl.$^7$ ................................ B60Q 1/08
(52) U.S. Cl. ................ 362/465; 362/428; 362/466; 362/523
(58) Field of Search ................ 362/428, 465, 362/466, 523, 467, 514, 526, 287; 315/82

(56) References Cited

U.S. PATENT DOCUMENTS 5,193,894 A    3/1993  Lietar et al. ................. 362/66
6,144,159 A  * 11/2000  Lopez et al. ................. 315/82

FOREIGN PATENT DOCUMENTS

| EP | 2 707 390 | 7/1993 |
| FR | 2 759 043 | 2/1998 |

OTHER PUBLICATIONS

French Search Report, Jul. 31, 2001.

* cited by examiner

*Primary Examiner*—Sandra O'Shea
*Assistant Examiner*—Bao Q Truong
(74) *Attorney, Agent, or Firm*—Morgan & Finnegan, LLP

(57) ABSTRACT

A device for automatic correction of the orientation of at least one motor-vehicle headlamp upon variations in the attitude of the motor vehicle includes an emitter projecting, onto the ground in front of the vehicle, two light spots ($T_1$, $T_2$) which are spaced apart in a direction parallel to the longitudinal axis of the vehicle, a sensor of the illumination of the light spots ($T_1$, $T_2$) comprising an objective forming an image ($I_1$, $I_2$) of the light spots ($T_1$, $T_2$) on a receiver and supplying an output signal ($dc_1$, $dc_2$) for each one, processing means suitable for deriving a control signal from the output signal from the sensor, and an actuator controlled by the control signal and able to alter the elevation orientation of a reflector of the headlamp.

13 Claims, 4 Drawing Sheets

DEVICE FOR AUTOMATIC CORRECTION OF THE ORIENTATION OF A MOTOR-VEHICLE HEADLAMP IN ELEVATION

FIELD OF THE INVENTION

The present invention relates to devices for automatic correction of the orientation of motor-vehicle headlamps, upon variations in the attitude of the vehicles.

BACKGROUND OF THE INVENTION

It is known that the regulations stipulate that the headlamps of a vehicle be set up so as to illuminate the road effectively in front of the vehicle without, however, dazzling the other drivers. For example, the upper cut-off of a European dipped beam should be inclined to the horizontal with an angle of depression lying between 1 and 1.5 hundredths of a radian.

However, when the vehicle is loaded, or when it accelerates or decelerates, the attitude of the vehicle can vary in large proportions, and the orientation of the headlamps is then no longer in accordance with the legislation: the cut-off is either raised and the headlamps dazzle the other drivers, or depressed and the illumination is completely insufficient.

One solution was first of all to arrange sensors in the vicinity of each wheel of the vehicle so as to determine its attitude, the information originating from these sensors being processed by a computer so as to drive a device for setting-up the orientation of the headlamps appropriately. Such a solution involves arranging wheel sensors at places on the vehicle where the space available is rationed, and additional wiring in the vehicle, the wheel sensors being, moreover, subjected to all the attacks from the outside environment, such that they have to possess excellent protection.

Devices for automatic correction without wiring are also known, for example from the document U.S. Pat. No. 5,193,894. The device described in this document comprises photosensitive cells which detect the variations in brightness of areas of the ground in front of the vehicle, which are illuminated by the headlamp. Processing means derive a signal, on the basis of the measurements from these cells, for the control of an actuator suitable for varying the inclination of the headlamp.

The major drawback of these devices lies in the fact that they are severely disturbed by external illumination such as the street lighting or the headlamps of other vehicles. The measurements taken by the photocells also depend strongly on the more or less reflecting nature of the surfaces illuminated in front of the vehicle. The setting obtained under these conditions is therefore not constant, and suffers substantial deviations depending on the environment of the vehicle.

It has been proposed, for example in the document FR-A-2 759 043, remedy these drawbacks by proposing an installation for setting up the illumination range of the headlamps of a vehicle, comprising a transmission installation which transmits at least one beam of electromagnetic rays falling on a region to the front of the vehicle, an electro-optical detection installation which gives an image point, at least of the irradiated region, an interpretation installation which interprets the position of at least one irradiated region, and produces a signal from it which is compared with a datum signal representing the correct setting of the illumination range, and, in the event of a deviation between the actual signal and the datum signal, setting-up installations are driven so as to cancel out this deviation.

Such an installation, even if it solves the problem of the stray illumination and of the surface states of the road surfacing, nevertheless exhibits drawbacks. This is because the measurements taken by this installation amounts to analysing the movement of a spot of light on the ground in front of the vehicle. It will therefore be understood that, for a constant attitude of the vehicle, the measurements will be disturbed by the variation in the height of the vehicle, that is to say during movements of simultaneous compression or of expansion of all the elements of the suspension of the vehicle, which impart pure vertical-translation movements on the chassis of the vehicle. During such vertical-translation movements, the light spot in front of the vehicle moves, and this is all the more so the further the illuminated area is from the vehicle. The movement of the light spot is then interpreted by the interpretation installation as a change in attitude, the latter then generating an erroneous correction signal for the setting-up installations.

SUMMARY OF THE INVENTION

The present invention falls within this context, and its object is to propose a device for automatic correction of the orientation of the headlamps of a motor vehicle in elevation upon variations in the attitude of the vehicle, which do not require the installation of wheel sensors nor their wiring, which is insensitive to variations in the height of the vehicle, which is simple to implement and reliable, while being inexpensive.

Thus the subject of the present invention is a device for automatic correction of the orientation of at least one motor-vehicle headlamp upon variations in the attitude of the motor vehicle, including an emitter projecting, onto the ground in front of the vehicle, two light spots which are spaced apart in a direction parallel to the longitudinal axis of the vehicle, a sensor of the illumination of the light spots comprising an objective forming an image of the light spots on a receiver and supplying an output signal for each one, processing means suitable for deriving a control signal from the output signal from the sensor, and an actuator controlled by the control signal and able to alter the elevation orientation of a reflector of the headlamp.

According to the present invention, the control signal for the actuator is derived by the processing means on the basis of a linear function of the output signals supplied by the sensor for each image of each light spot.

According to other advantageous and non-limiting characteristics of the invention:

the linear function between the output signals from the sensor for each image of each light spot is of the form $dc_1 - a \times dc_2 = K \times (\theta - \theta_0) + b$, where a, b and $\theta_0$ are constants characteristic of the geometry of the correction device, $\theta$ is an angle representative of the attitude of the vehicle, and where K is a magnitude representative of the height of the vehicle;

the emitter and the sensor are fixed with respect to one another;

the emitter and the sensor are integral with a movable part of the vehicle;

the movable part of the vehicle consists of the reflector of a headlamp of the vehicle;

the emitter and the sensor are fixed with respect to the vehicle;

the emitter and the sensor are situated one on a fixed part of the vehicle, the other on a movable part of the vehicle;

the light spots define a straight-line segment substantially parallel to the longitudinal axis of the vehicle;

the emitter and the sensor are situated substantially in the same vertical plane;

the direction of illumination of the emitter and the optical axis of the sensor are contained in the same vertical plane parallel to the longitudinal axis of the vehicle.

BRIEF DESCRIPTION OF THE DRAWINGS

Other objects, characteristics and advantages of the present invention will emerge clearly from the description which will now be given of an embodiment example given in a non-limiting way by reference to the attached drawings, in which.

DESCRIPTION OF THE PREFERRED EMBODIMENTS

Figure 1:
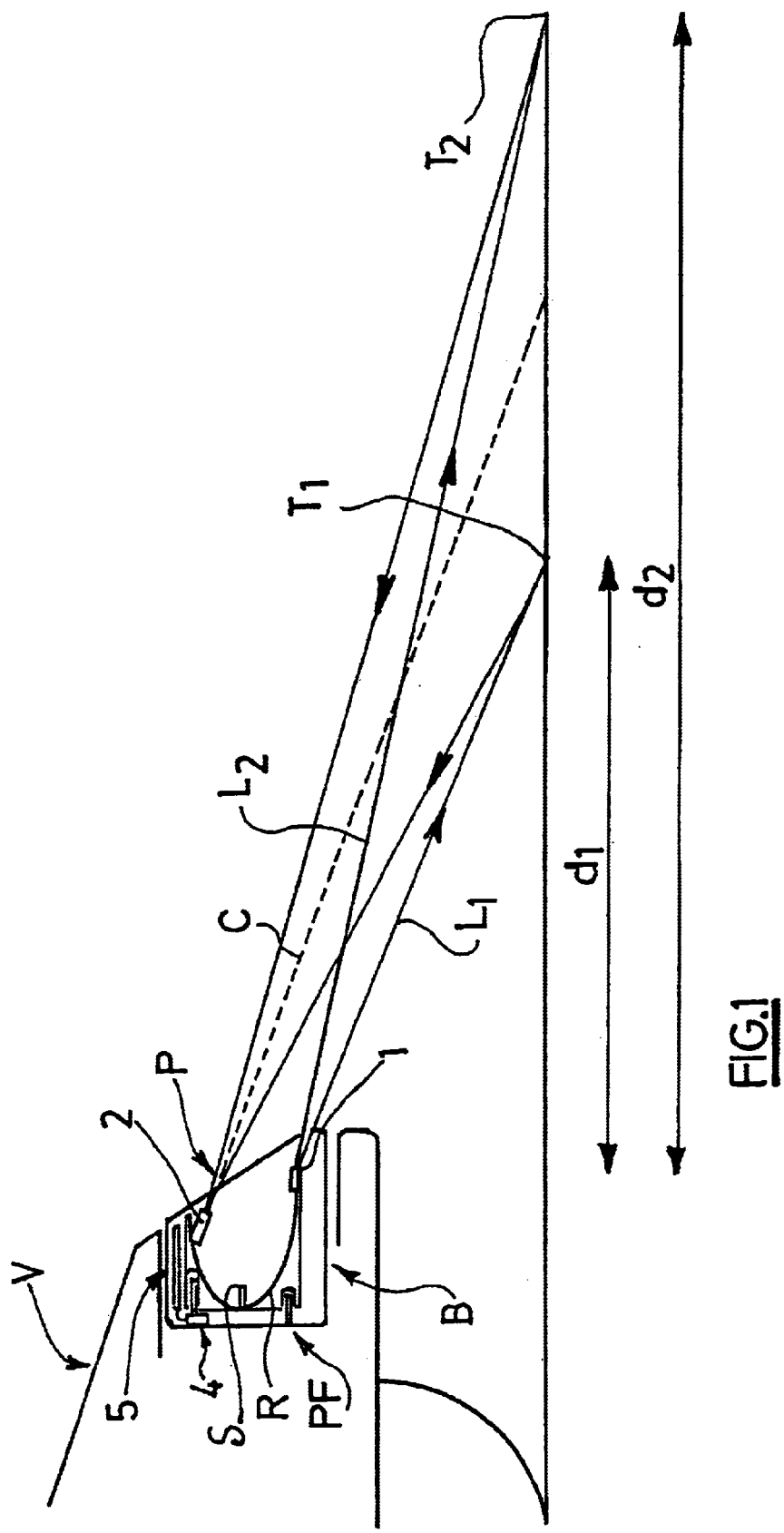
FIG. 1 represents a diagrammatic view of the front of a vehicle illustrating the principle of the invention according to a first embodiment.

On FIG. 1 has been represented, diagrammatically, the front of a vehicle V, equipped in a conventional way with headlamps P, a single headlamp having been represented. The headlamp P includes a reflector R interacting with a light source S integral with the latter so as the form a light beam for illuminating the road in front of the vehicle V. In the event that the headlamp P is intended to send out a dipped beam, the reflector R could be of the type able by itself to generate a beam with cut-off, or be of the elliptical type, being integral with a converging lens the object focus of which is co-incident with one of the foci of the elliptical reflector the other focus of which is situated in the immediate vicinity of the light source S.

In the embodiment of FIG. 1, an emitter 1 is integral with the reflector R, as is a sensor 2. The emitter 1 projects two light spots $T_1$ and $T_2$ onto the ground in front of the vehicle V at different distances $d_1$ and $d_2$, the spots $T_1$ and $T_2$ defining a straight-line segment parallel to the longitudinal axis of the vehicle. These spots $T_1$ and $T_2$ are situated in the field of view C of the sensor 2. The emitter 1 and the sensor 2 are situated substantially in the same vertical plane parallel to the longitudinal axis of the vehicle, and the direction of illumination from the emitter 1 and the optical axis of the sensor 2 are contained in this plane, for example the plane of the FIG. 1.

Upon changes in attitude by the vehicle V, the spots $T_1$ and $T_2$ move on the ground, these movements being observed by the sensor 2, which delivers a corresponding signal, this signal being supplied to processing means 5, for example a computer or a microprocessor, which determine whether a correction to the orientation of the headlamp is necessary. If so, a command signal is generated by the computer 5 so as to steer an actuator 4 in one direction or another. The actuator 4 is situated in the housing B of the headlamp P and causes the reflector R to tilt about a fixed point PF of the housing B, which alters the inclination of the reflector R, and therefore that of the light beam generated by it. With the emitter 1 being integral with the reflector R, the movement of the latter entails the movement of the spots $T_1$ and $T_2$ on the ground, which is observed by the sensor C.

The tilting of the reflector continues until the spots $T_1$ and $T_2$ occupy their reference position with respect to the horizontal, and corresponding to a correct inclination of the light beam, despite the change in the attitude of the vehicle. The correction of the elevation orientation of the headlamp P can thus be obtained dynamically, this correction being performed in closed loop.

Figure 2:
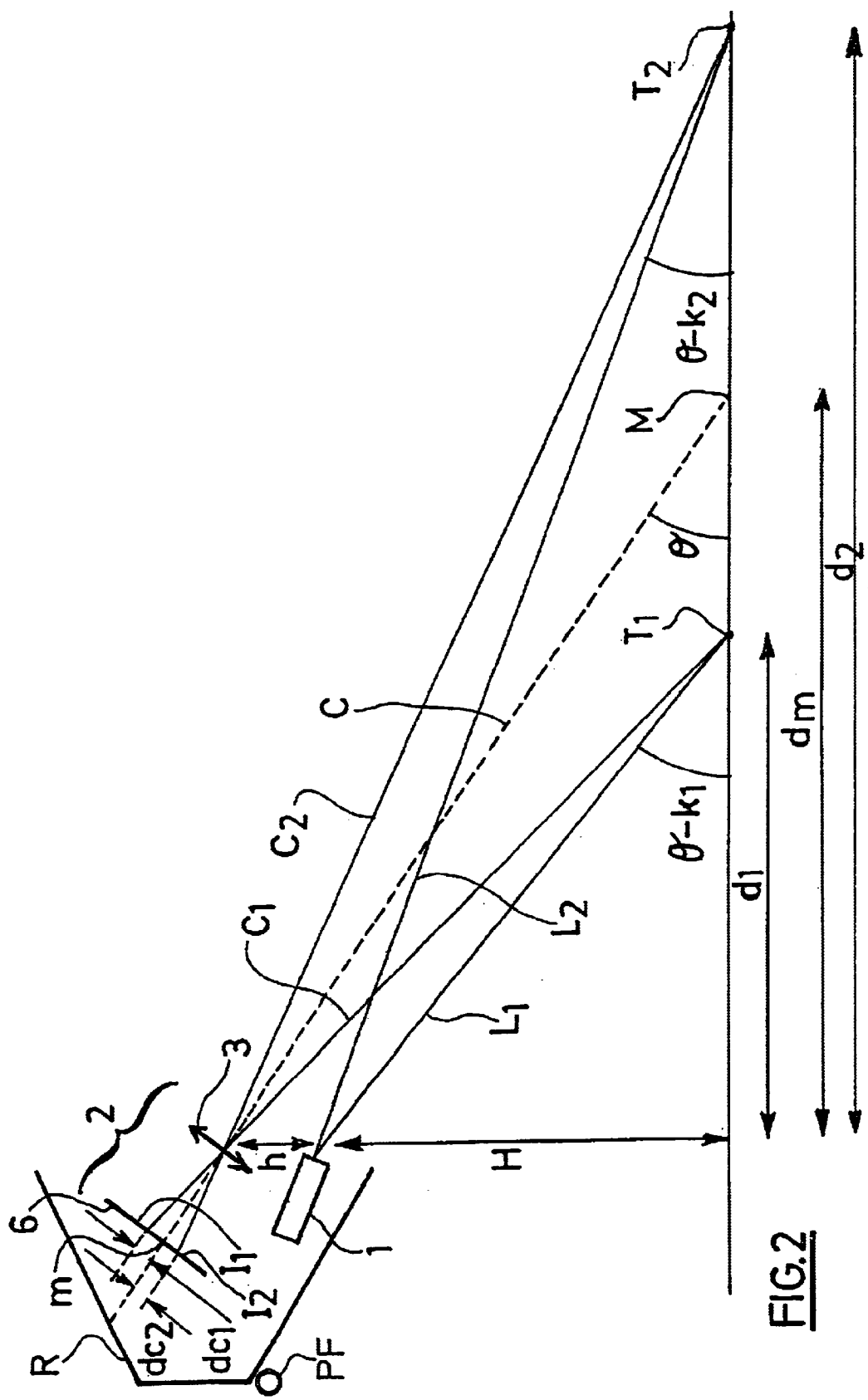
FIG. 2 represents a theoretical operating diagram of the correction device according to the first embodiment.

More precisely, as has been represented in FIG. 2, the emitter 1, placed at a height H above the road, sends out two pencil light beams $L_1$ and $L_2$ so as the form the spots $T_1$ and $T_2$ on the road in front of the vehicle, at distances $d_1$ and $d_2$ from the vertical of the emitter 1. The sensor 2, placed at a height h above the emitter 1, comprises an objective 3 forming, from the spots $T_1$ and $T_2$, images $I_1$ and $I_2$ on a photosensitive surface 6. The objective 3 defines the optical axis C of the sensor.

The emitter 1 and the sensor 2 are integral with one another and with the reflector R. The sensor 1 therefore measures the attitude of the reflector R. The emitter 1 and the sensor 2 are oriented in such a way that, when the orientation of the reflector R is the regulation or nominal orientation, the optical axis C of the sensor intercepts the road at a point M situated at a distance $d_m$ from the vertical of the emitter 1, substantially in the middle of the straight-line segment lying between the spots $T_1$ and $T_2$. The spots $T_1$ and $T_2$ are seen by the sensor in directions $C_1$ and $C_2$. The optical axis C forms an angle $\theta$ with the road, and the pencil beams $L_1$ and $L_2$ form angles $(\theta-k_1)$ and $(\theta-k_2)$ with the road, $k_1$ and $k_2$ being the angles formed respectively between $L_1$ and C, and between $L_2$ and C.

The objective 3 of the sensor 2 can be analysed as being equivalent to a converging lens, with focal length f This objective 3 forms, on the photosensitive surface 6, images $I_1$ and $I_2$ of the spots $T_1$ and $T_2$, these images $I_1$ and $I_2$ being respectively at distances $dc_1$, and $dc_2$ from the centre m of the surface 6, corresponding to the intersection between the surface 6 and the optical axis C.

Geometric considerations make it possible to determine the distances $dc_1$ and $dc_2$. Thus these formulae are obtained:

$$dc_1 = f \times \frac{-H \times \tan(k_1) \times \tan^2(\theta) + h \times \tan(\theta) - (h+H) \times \tan(k_1)}{(h+H) \times \tan^2(\theta) - h \times \tan(k_1) \times \tan(\theta) + H} \quad (1)$$

$$dc_2 = f \times \frac{-H \times \tan(k_2) \times \tan^2(\theta) + h \times \tan(\theta) - (h+H) \times \tan(k_2)}{(h+H) \times \tan^2(\theta) - h \times \tan(k_2) \times \tan(\theta) + H} \quad (2)$$

It is possible, moreover, to determine the constants $k_1$ and $k_2$, characteristic of the specific geometry of the device used, such that:

$$\tan(k_1) = \frac{d_{10} \times (h + H_0) - H_0 \times d_{mO}}{H_0 \times (h + H_0) + d_{10} \times d_{mO}} \quad (3)$$

and $$\tan(k_2) = \frac{d_{20} \times (h + H_0) - H_0 \times d_{mO}}{H_0 \times (h + H_0) + d_{20} \times d_{mO}} \quad (4)$$

where $d_{10}$, $d_{20}$, $d_{mO}$ and $H_0$ are the nominal initial values of $d_1$, $d_2$, $d_m$ and $H$. These nominal initial values are obtained for an unloaded vehicle, the inclination of the headlamp P being correctly set up.

It emerges clearly from the formulae (1) and (2) that $dc_1$ and $dc_2$ are functions only of the height H of the emitter 1, and consequently of the vehicle, and of the angle θ of inclination of the sensor 2 with respect to the road, and consequently of the attitude of the vehicle.

Figure 3:
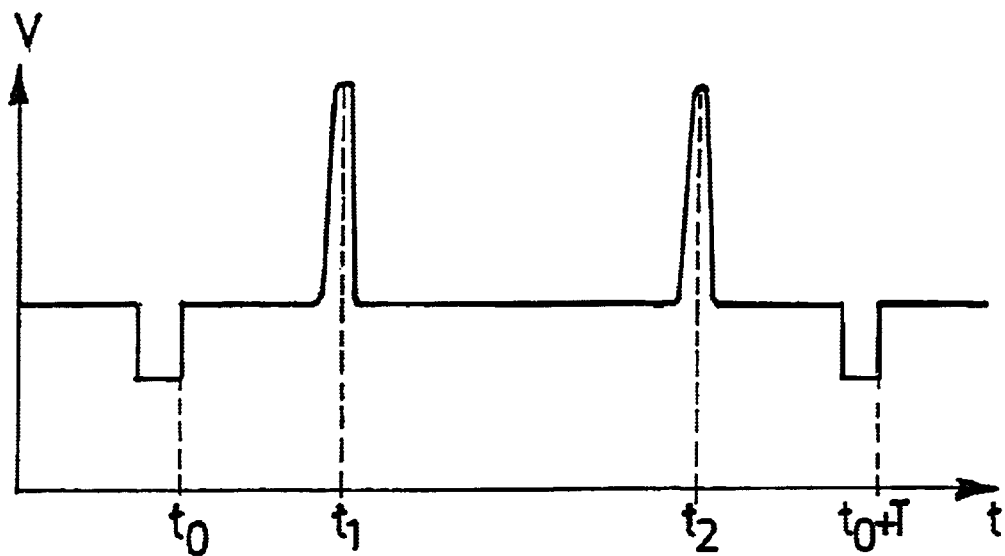
FIG. 3 represents, in graphical form, the signal delivered by the sensor equipping the device of the invention.

The photosensitive surface 6 on which the images $I_1$ and $I_2$ are formed advantageously consists of a linear CCD array (charge-coupled elements). When the elements of this array are scanned by the appropriate electric means, the signal obtained is of the form which is represented in FIG. 3, each image $I_1$ and $I_2$ situated at the distance $dc_1$ and $dc_2$ from the sensor m of the surface 6 giving rise to a voltage spike at the instants $t_1$ and $t_2$. The signal of FIG. 3 includes, for example, a periodic negative pulse, of period T, at the instants to $t_0+nT$, and positive pulses at the instants $t_1$ and $t_2$.

The signal of FIG. 3 is supplied to the processing means 5 which, for each scan, calculate, from $t_1$ and $t_2$, the values of $dc_1$ and $dc_2$, functions of the height H and of the angle θ as was seen above.

In accordance with the present invention, the processing means 5 derive a linear function of $dc_1$ and $dc_2$, of the form:

$$dc_1 - a \times dc_2 = K \times (\theta - \theta_0) + b \quad (5)$$

where $\theta_0$ is the nominal initial value of the angle θ, obtained for an unloaded vehicle with a headlamp P correctly set up in inclination, and having the value:

$$\tan(\theta_0) = \frac{h + H_0}{dm_0} \quad (6)$$

where a and b are constants, of the form:

$$a = \frac{1 - \tan(k_1) \times \tan(k_2) + (\tan^2(\theta_0) - 1) \times \frac{\tan(k_1)}{\tan(\theta_0)}}{1 - \tan(k_1) \times \tan(k_2) + (\tan^2(\theta_0) - 1) \times \frac{\tan(k_2)}{\tan(\theta_0)}} \quad (7)$$

$$b = f \times \frac{\tan(k_2) - \tan(k_1)}{1 - \tan(k_1) \times \tan(k_2) + (\tan^2(\theta_0) - 1) \times \frac{\tan(k_2)}{\tan(\theta_0)}} \quad (8)$$

and where K is a function of the height H of the emitter 1. Formula (5) is written:

$$dc_1 - a \times dc_2 = b \quad (9)$$

for the nominal initial value $\theta_0$ of the angle θ, and no longer depends on the height H of the emitter 1. It follows that all the curves of equation (5) pass through the same point for the nominal initial value $\theta_0$ of the angle θ, as has been represented in FIG. 4, whatever the height H of the emitter 1.

Figure 4:
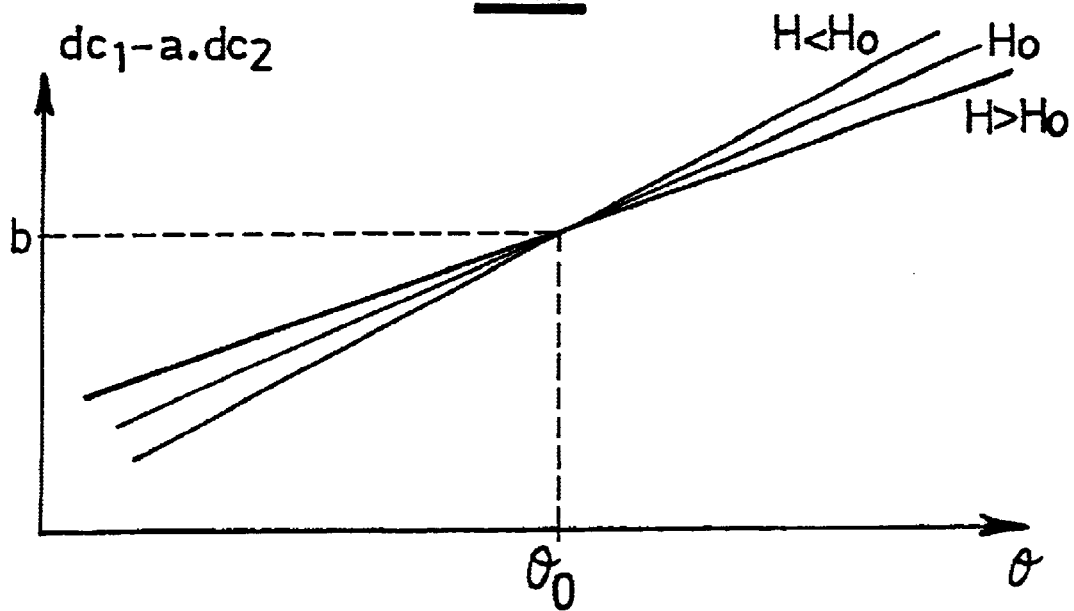
FIG. 4 represents an example of an array of curves derived by the processing means equipping the device of the invention.

As can be seen in FIG. 4, about the nominal initial position ($\theta_0$, $H_0$), the value of the equation (5) is very little dependent on the value H of the height of the emitter 1. It is therefore sufficient for the processing means 5 to calculate the value of the equation (5) and to compare the result with the constant b as defined by the relationship (8). The result of this comparison indicates the direction in which the headlamp P should be actuated:

if $dc_1 - a \times dc_2 = b$, the headlamp is correctly set up, the processing means 5 do not send out any signal, if $dc_1 - a \times dc_2 < b$, that means that the angle θ is less than the nominal initial angle $\theta_0$, and that the beam sent out by the headlamp P is too high. The processing means 5 then send out a control signal for the actuator 4, so that the latter inclines the headlamp P further downwards, and if $dc_1 - a \times dc_2 > b$, that means that the angle θ is greater than the nominal initial angle $\theta_0$, and that the beam sent out by the headlamp P is too low. The processing means 5 then send out a control signal for the actuator 4, so that the latter inclines the headlamp P further upwards.

In the last two cases, as long as $dc_1 - a \times dc_2 \neq b$, the processing means send out a control signal proportional to the absolute value of the difference $(dc_1 - a \times dc_2) - b$, until this absolute value is equal to zero. The actuator 4 is then driven proportionally to the size of the correction to be applied to the inclination of the headlamp P. It results therefrom that the correction will be carried out all the more rapidly, which is important in order to reduce any dazzling of the other drivers in the case of a light beam which is too high.

Thus a device has actually been implemented for automatic correction of the orientation of motor-vehicle headlamps in elevation upon variations in attitude of the vehicle. The control signals sent out by the processing means 5 for the correction of the headlamp P could be used by a second actuator 4' placed in the housing of the other headlamp P' of the vehicle in order simultaneously to correct the orientation of the two headlamps by the use of a single automatic-correction device, or each headlamp of the vehicle could be equipped with its own automatic-correction device. The device according to the present invention does not require any wiring in the vehicle other than for its installation in the housing of the headlamp. The device corrects the orientation of motor-vehicle headlamps in elevation only upon variations in attitude of the vehicle, and it is insensitive to the variations in height of the vehicle.

Such an automatic-correction device is simple to implement and reliable. This is because it suffices to arrange an emitter, a sensor and an actuator in the housing of the headlamp P, these components all being well known and fully understood, and means for processing the signal generated by the sensor, which can amount to no more than a suitably programmed microprocessor. The electrical links between these various components are short, and contained completely in the housing of the headlamp. Moreover, the linear function which the processing means use to generate the control signal for the actuator 4 involves two constants a and b, which are themselves calculated on the basis of the constants $d_{10}$, $d_{20}$, $d_{mO}$ and $H_0$, the nominal initial values of $d_1$, $d_2$, $d_m$ and H, and geometric constants h and f of the device.

If the nominal initial values and the geometric constants of the device are known with precision, it is then easy to calculate the constants a and b theoretically, and to store them in the processing means 5, for example in an erasable and programmable read-only memory, of the EEPROM type.

If the nominal initial values and the geometric constants of the device are not known, or are known with insufficient precision, it is possible to determine the constants a and b experimentally. To do that, it is sufficient to observe the distances $dc_1$ and $dc_2$ of the images $I_1$ and $I_2$ of the spots $T_1$ and $T_2$ on the photosensitive surface 6 for two specific positions of the vehicle, for example the nominal initial position (vehicle unloaded, inclination of the headlamp correctly set up) and an extreme position (vehicle fully loaded, inclination of the headlamp correctly set up).

It is then possible to proceed in the following way:

the orientation of the headlamps of the vehicle is set up manually, the automatic-correction device being inhibited;

the distances of the images $I_1$ and $I_2$ of the spots $T_1$ and $T_2$ on the photosensitive surface 6 are measured, the vehicle being unloaded, and therefore in nominal initial position, the distances measured then being equal to $dc_{10}$ and $dc_{20}$;

the distances of the images $I_1$ *and* $I_2$ of the spots $T_1$ and $T_2$ on the photosensitive surface 6 are measured, the vehicle being fully loaded, the distances measured then being equal to their minimum value $dc_{1,\,min}$ and $dc_{2,\,min}$;

$a$ is calculated, $a = \dfrac{dc_{10} - dc_{1,min}}{dc_{20} - dc_{2,min}}$;

b is calculated, $b = dc_{10} - a \times dc_{20}$, and a and b are stored in the processing means 5, for example in an erasable and programmable read-only memory, of the EEPROM type.

These settings, measurements and calculations can advantageously be carried out at the end of the motor-vehicle production line, when the vehicle is completely fitted out and ready to be delivered. The reference angle θ used for the measurements can be taken with respect to an axis different from the optical axis of the sensor 2, but situated in the field of view of the latter, if the settings, measurements or calculations are thereby facilitated.

This is because, in considering another reference axis, the distances of the images $I_1$ and $I_2$ of the spots $T_1$ and $T_2$ on the photosensitive surface 6 are slightly offset by a value Δ, so that they become: $dc'_1 = dc_1 + \Delta$ and $dc'_2 = dc_2 + \Delta$. The relationship (5) is then written:

$$dc'_1 - a \times dc'_2 = K(\theta - \theta_0) + b + \Delta \times (1-a) \qquad (10)$$

and all the calculations mentioned above can be repeated without change.

Figure 5:
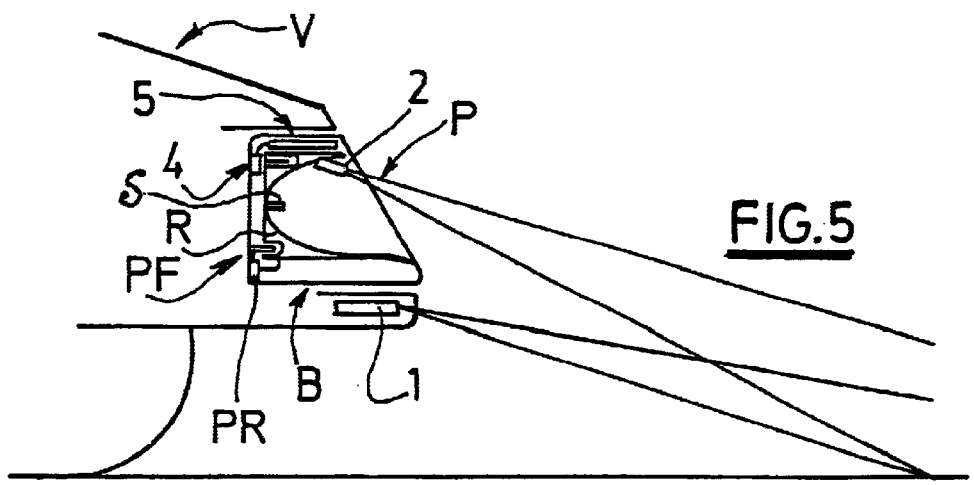
FIG. 5 represents a diagrammatic view of the front of a vehicle illustrating the principle of the invention according to a second embodiment.

According to a second embodiment, represented in FIG. 5, the emitter 1 is installed on a fixed part of the vehicle, for example on the housing of the headlamp P or on a part of the vehicle itself, while the sensor 2 is integral with the reflector R, as in the preceding embodiment. A device installed in this way functions exactly as in the preceding embodiment. It requires only the addition of apparatus making it possible, at every instant, to know the relative orientation of the sensor 2 with respect to the emitter 1. It would be possible, for example, to fit a recopy potentiometer PR in the vicinity of the fixed point PF on which the reflector R is articulated, the information output from this potentiometer being supplied to the processing means in order to correct the variation in the angle between the emitter 1 and the sensor 2.

Figure 6:
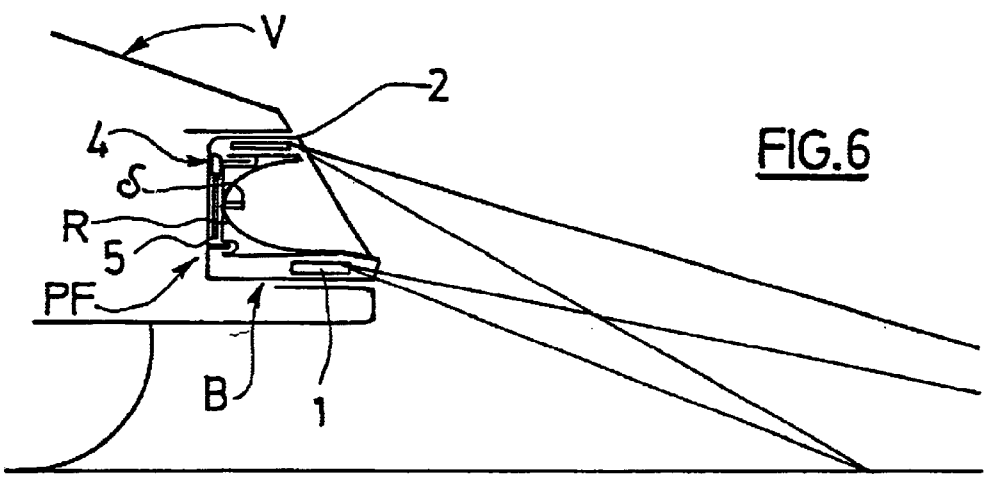
FIG. 6 represents a diagrammatic view of the front of a vehicle illustrating the principle of the invention according to a third embodiment.

According to a third embodiment, represented in FIG. 6, the emitter 1 and the sensor 2 are both installed on a fixed part of the vehicle, for example both in the housing of the headlamp P. A device installed in this way functions exactly as in the first embodiment, and will therefore not be described in detail.

Figure 7:
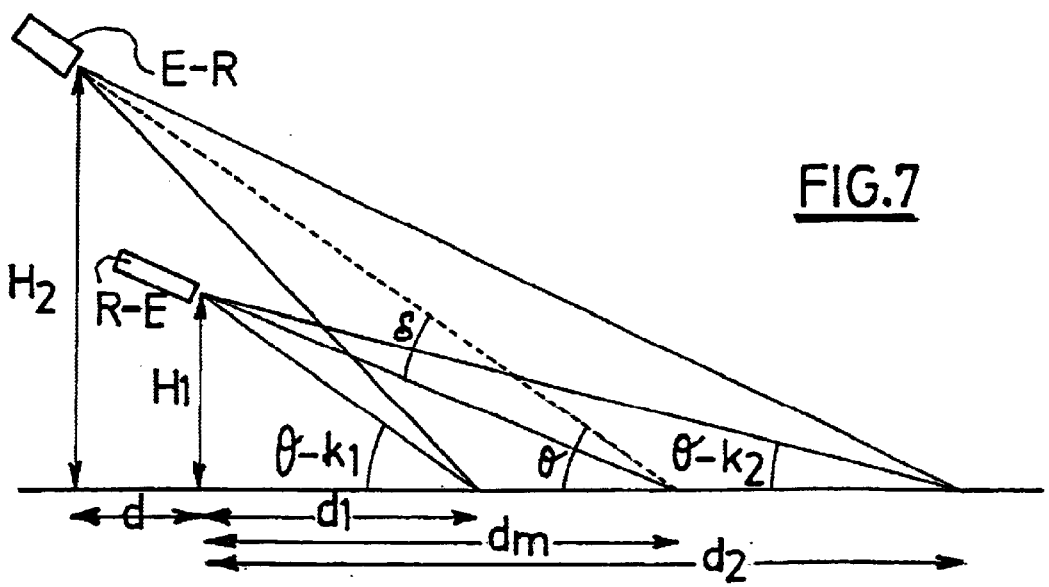
FIG. 7 represents a general diagram of the operating principle of the correction device according to the present invention.

According to the three embodiments described above, it is quite clear that the relative positions of the emitter and of the sensor could be interchanged, the emitter 1 being located, for example, above the sensor 2. It results therefrom that a general diagram of the operating principle of the automatic-correction device according to the present invention can be drawn up, like the one which is represented in FIG. 7.

A component E-R is seen in this figure, which can be an emitter or a receiver, and a component R-E, which can be a receiver or an emitter respectively. One is placed at a height $H_1$, the other is placed at a height $H_2$. They are arranged in vertical planes spaced horizontally by a fixed distance d. They exhibit a relative orientation represented by the angle δ, which is possibly variable. By way of the taking into account of the additional geometric constants d and δ, which are characteristic of the device used, it is possible to follow the same reasoning and to re-write formulae (1) to (2) above, so as to arrive at a linear relation of the form:

$$dc_1 - a \times dc_2 = b$$

which it is appropriate to take into account between the positions $dc_1$ and $dc_2$, on the photosensitive surface of the sensor, of the images $I_1$ and $I_2$ of the light spots $T_1$ and $T_2$ projected by the emitter.

It is thus possible to arrange the emitter or the sensor at any desired place on the vehicle, the emitter being arranged, for example, level with the headlamp or with the front bumper of the vehicle, while the sensor could be arranged in the passenger compartment, for example behind the rear-view mirror.

A device has therefore actually been produced for automatic correction, in real time, of the orientation of motor-vehicle headlamps in elevation, upon variations in attitude of the vehicle. It would be possible to use a single device for the two headlamps of the vehicle, in which case the control signals sent out by the processing means for the correction of the orientation of one headlamp could be used for the simultaneous correction of the orientation of the other headlamp of the vehicle. It would also be possible to use a correction device associated with each headlamp. According to the embodiments represented in FIGS. 1, 2, 5 and 6, the device does not require any wiring in the vehicle other than for its installation in the housing of the headlamp, which thus constitutes a self-contained unit with automatic correction incorporated. The device corrects the elevation orientation of motor-vehicle headlamps only upon variations in attitude of the latter, and it is insensitive to the variations in height of the vehicle.

Needless to say, the present invention is not limited to the embodiments which have been described, but the person skilled in the art, on the contrary, could apply numerous modifications to it which come within his scope. Thus, for example, it would be possible to use two emitters each projecting a light spot onto the ground. These two emitters will be integral with one another in such a way that the light spots are formed by light rays forming a constant and predetermined angle between them. It would be possible, for example, to use light-emitting diodes or laser diodes mounted on the same circuit, appropriate optics forming the emerging rays. The laser diodes will advantageously emit infra-red radiation. Likewise, provision could be made for the light spots to be emitted alternately, or for them to be emitted continuously, their intensity being modulated according to a predetermined law. It would also be possible to make provision to replace the CCD or CMOS sensor with an analogue positioning circuit, of the PSD (Position Sensor Device) type.

What is claimed is:

1. A device for automatic correction of the orientation of at least one motor-vehicle headlamp upon attitude variations of the motor vehicle, including:
   an emitter projecting, onto the ground in front of the vehicle, two light spots which are spaced apart in a direction parallel to the longitudinal axis of the vehicle,
   a sensor of the illumination of the light spots comprising an objective forming images of the two light spots on a surface and supplying output signal for each of the light spots,
   processing means suitable for deriving a control signal from the output signal from the sensor, and
   an actuator controlled by the control signal and able to alter an elevation orientation of a reflector of the headlamp,
   wherein the control signal for the actuator is derived by the processing means from a linear function of the output signals supplied by the sensor for each image of each light spot.

2. The device according to claim 1, wherein the emitter and the sensor are fixed with respect to one another.

3. The device according to claim 2, wherein the emitter and the sensor are integral with a movable part of the vehicle.

4. The device according to claim 3, wherein the movable part of the vehicle consists of the reflector of a headlamp of the vehicle.

5. The device according to claim 2, wherein the emitter and the sensor are fixed with respect to the vehicle.

6. The device according to claim 1, wherein the light spots define a straight-line segment substantially parallel to the longitudinal axis of the vehicle.

7. The device according to claim 1, wherein the emitter and the sensor are situated substantially in the same vertical plane.

8. The device according to claim 1, wherein the direction of illumination of the emitter and the optical axis of the sensor are contained in the same vertical plane parallel to the longitudinal axis of the vehicle.

9. The device according to claim 1, wherein the emitter is situated on a fixed part of the vehicle, and the sensor is situated on a movable part of the vehicle.

10. The device according to claim 1, wherein the emitter is situated on a movable part of the vehicle, and the sensor is situated on a fixed part of the vehicle.

11. The device according to claim 1, wherein the linear function between the output signals from the sensor for each image of each light spot is of the form:

$$dc_1 - a \times dc_2 = K \times (\theta - \theta_0) + b.$$

wherein $\theta$ is an angle formed between an optical axis of the sensor and the ground in front of the vehicle;
   wherein $\theta_0$ is a nominal initial value of the angle $\theta$ when the elevation orientation of the reflector of the headlamp is correctly set up in inclination;
   wherein $dc_1$ is a first of the output signals, and $dc_2$ is a second of the output signals;
   wherein $K$ is a magnitude representative of the vehicle's height;
   wherein a first beam corresponding to a first of the two light spots forms an angle $\theta - k_1$ with the ground in front of the vehicle,
   wherein a second beam corresponding to a second of the two light spots forms an angle $\theta - k_2$ with the ground in front of the vehicle, $$\text{wherein } a = \frac{1 - \tan(k_1) \times \tan(k_2) + (\tan^2(\theta_0) - 1) \times \frac{\tan(k_1)}{\tan(\theta_0)}}{1 - \tan(k_1) \times \tan(k_2) + (\tan^2(\theta_0) - 1) \times \frac{\tan(k_2)}{\tan(\theta_0)}}, \text{ and}$$

$$\text{wherein } b = f \times \frac{\tan(k_2) - \tan(k_1)}{1 - \tan(k_1) \times \tan(k_2) + (\tan^2(\theta_0) - 1) \times \frac{\tan(k_2)}{\tan(\theta_0)}}.$$

12. The device according to claim 3, wherein the movable part of the vehicle includes the reflector of the headlamp of the vehicle.

13. The device according to claim 1, wherein each of the output signals represents a distance of the image of the corresponding light spot from a center of the surface.

* * * * *